(12) United States Patent
Marcus et al.

(10) Patent No.: US 9,074,069 B2
(45) Date of Patent: Jul. 7, 2015

(54) CONTROLLABLY DEGRADABLE THERMOPLASTIC POLYURETHANE AND OVERGRIPS MADE THEREFROM

(71) Applicant: ECO SPORTS LLC., Mentor, OH (US)

(72) Inventors: David R. Marcus, Kfar Saba (IL); Jeff Pura, Armadale (AU); John Cartledge, Dandenong Sth. (AU); Julius Stockfish, Pepper Pike, OH (US)

(73) Assignee: ECO SPORTS, LLC, Mentor, OH (US)

( * ) Notice: Subject to any disclaimer, the term of this patent is extended or adjusted under 35 U.S.C. 154(b) by 0 days.

(21) Appl. No.: 14/272,628

(22) Filed: May 8, 2014

(65) Prior Publication Data

US 2014/0343214 A1    Nov. 20, 2014

Related U.S. Application Data

(60) Provisional application No. 61/822,981, filed on May 14, 2013, provisional application No. 61/925,293, filed on Jan. 9, 2014.

(51) Int. Cl.
*C08K 3/34* (2006.01)

(52) U.S. Cl.
CPC .................................... *C08K 3/34* (2013.01)

(58) Field of Classification Search
CPC ........................................................ C08K 3/34
USPC .......................................... 524/394, 400.451
See application file for complete search history.

(56) References Cited

U.S. PATENT DOCUMENTS

| | | | |
|---|---|---|---|
| 4,158,378 A | 6/1979 | Pearson et al. |
| 4,196,148 A | 4/1980 | Mahoney |
| 4,222,955 A | 9/1980 | Chung et al. |
| 4,254,272 A | 3/1981 | Chung et al. |
| 4,365,051 A | 12/1982 | Chung et al. |
| 5,142,001 A | 8/1992 | Yasuda et al. |
| 5,208,379 A | 5/1993 | Yang et al. |
| 5,435,549 A | 7/1995 | Chen et al. |
| 5,502,158 A | 3/1996 | Sinclair et al. |
| 5,904,979 A | 5/1999 | Kakuishi et al. |
| 6,177,494 B1 | 1/2001 | Kopp et al. |
| 6,228,969 B1 | 5/2001 | Lee et al. |
| 6,306,942 B1 | 10/2001 | McCarthy et al. |
| 6,376,742 B1 | 4/2002 | Zdrahala et al. |
| 6,437,013 B2 | 8/2002 | Kuwamura et al. |
| 6,541,550 B1 | 4/2003 | McCarthy et al. |
| 6,576,911 B1 | 6/2003 | Potyrailo et al. |
| 2001/0056170 A1 | 12/2001 | Kaufhold et al. |
| 2002/0028857 A1 | 3/2002 | Holy |
| 2008/0154164 A1 | 6/2008 | Sheehan et al. |
| 2012/0259061 A1* | 10/2012 | Felice et al. ................. 524/591 |

FOREIGN PATENT DOCUMENTS

JP      2005-146130      6/2005

OTHER PUBLICATIONS

"Tackifiers (natural, synthetic)" Taken from the Internet on Apr. 29, 2014 URL: http://www.specialchem4adhesives.com/tc/antioxidants/?id=nattackifiersstab.
International Search Report for International Application No. PCT/IL/ 14/50408 dated Aug. 22, 2014.

* cited by examiner

*Primary Examiner* — Kriellion Sanders
(74) *Attorney, Agent, or Firm* — Pearl Cohen Zedek Latzer Baratz LLP

(57) ABSTRACT

Controllably degradable overgrips are provided, as well as methods of producing controllably degradable thermoplastic polyurethane. Methods comprise pre-blending a catalyst on a matrix, dispersing a specified amount of the pre-blended catalyst throughout solid granular thermoplastic polyurethane to yield a polymer component, and determining an onset timing of hydrolytic breakdown of the polymer component by adjusting the specified amount of dispersed catalyst. The thermoplastic polyurethane may be produced by reacting low molecular weight aliphatic diol(s) with aliphatic dicarboxylic acid(s) to produce polyester, and reacting the polyester with organic di-isocyanate(s) and diol chain extender(s) using catalytic amounts of alkali or alkaline earth metal salt(s) of $C_{10}$ to $C_{45}$ aliphatic carboxylic acid(s). Tackifying resins may be added to adjust an adhesive profile of the overgrips.

13 Claims, 4 Drawing Sheets

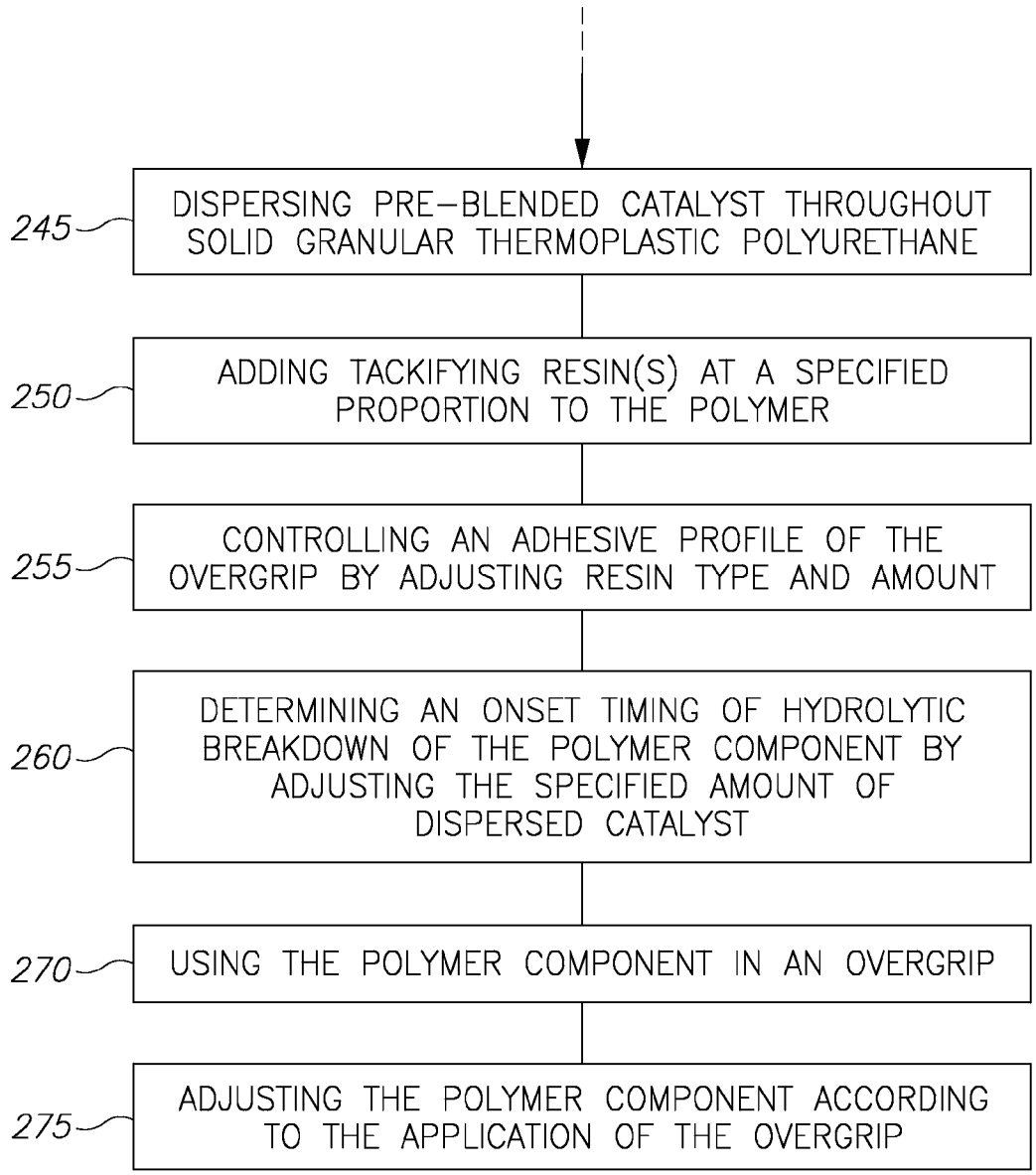
Figure 2 (cont. 1)

US 9,074,069 B2

CONTROLLABLY DEGRADABLE THERMOPLASTIC POLYURETHANE AND OVERGRIPS MADE THEREFROM

CROSS REFERENCE TO RELATED APPLICATIONS

This application claims the benefit of U.S. Provisional Patent Application No. 61/822,981 filed on May 14, 2013, and of U.S. Provisional Patent Application No. 61/925,293 filed on Jan. 9, 2014 which are both incorporated herein by reference in their entirety.

BACKGROUND OF THE INVENTION

1. Technical Field

The present invention relates to the field of polymeric overgrips, and more particularly, to degradable thermoplastic polyurethane overgrips.

2. Discussion of Related Art

Thermoplastic polyurethanes (TPU) is used as overgrip material for handles of tennis, squash and other racquet sporting equipment as well as for hockey sticks and cricket bats. TPU is used for its flexibility and feel as well as for its high degree of chemical and general resistance to wear, fatigue and exterior conditions involving weathering and UV attack.

SUMMARY OF THE INVENTION

One aspect of the present invention provides overgrips comprising a polymer component which comprises thermoplastic polyurethane, and a catalyst on a matrix, dispersed throughout a granular phase of the thermoplastic polyurethane at an amount selected to yield a specified onset timing of hydrolytic breakdown of the polymer component.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
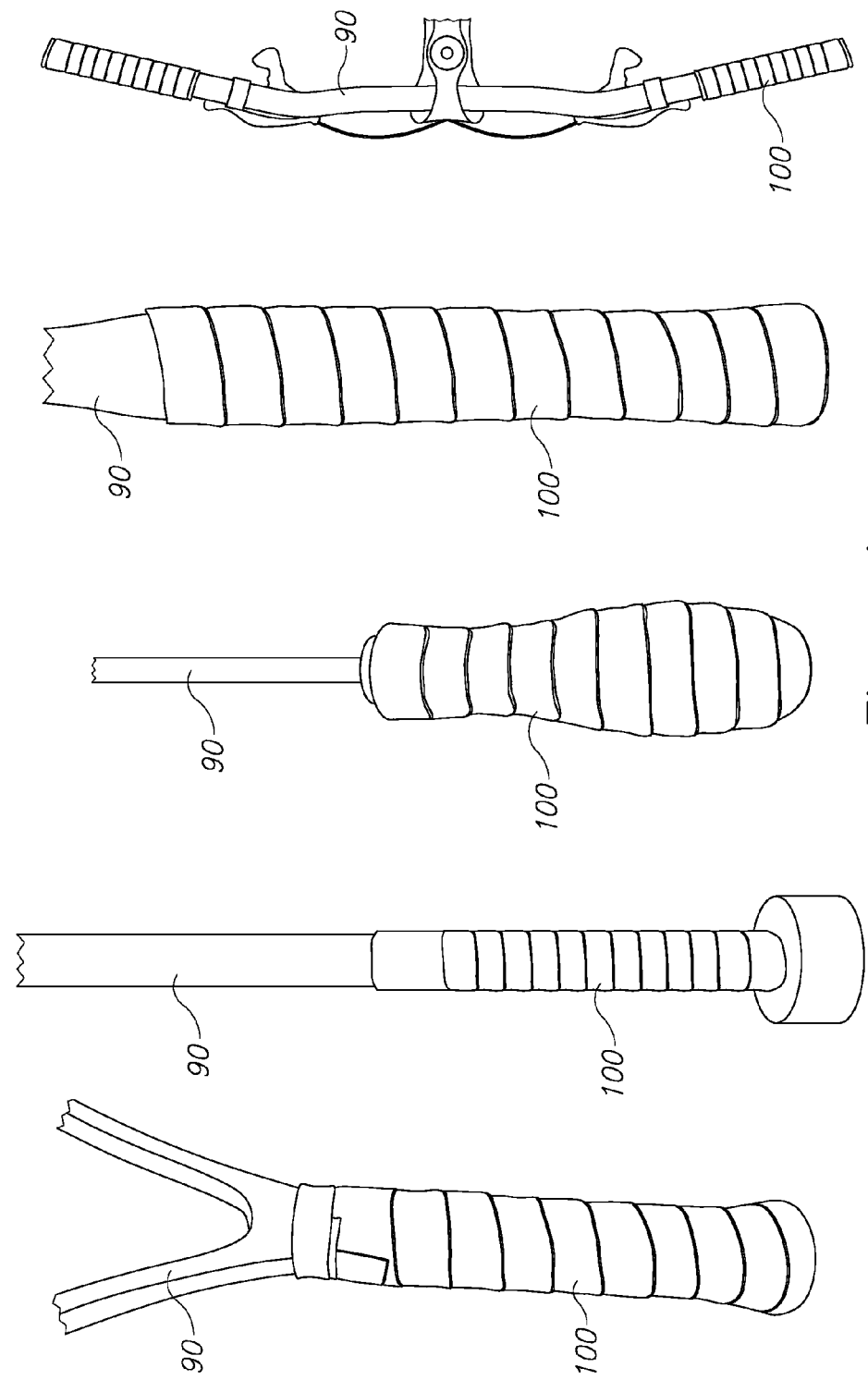
FIG. 1 is a high level schematic illustration of exemplary applications of degradable overgrips, according to some embodiments of the invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
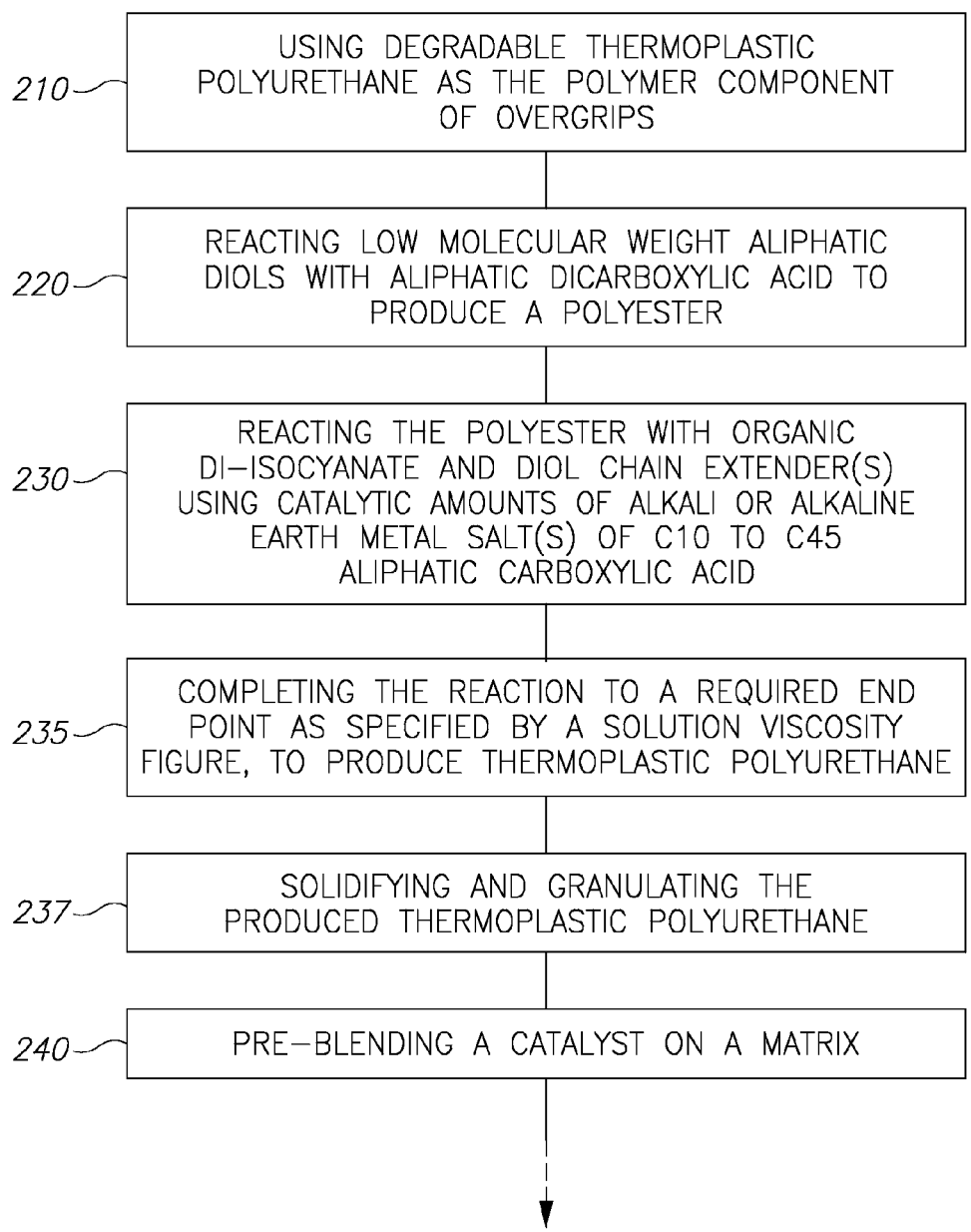
FIG. 2 is a high level flowchart illustrating a method, according to some embodiments of the invention.
Figure 3:
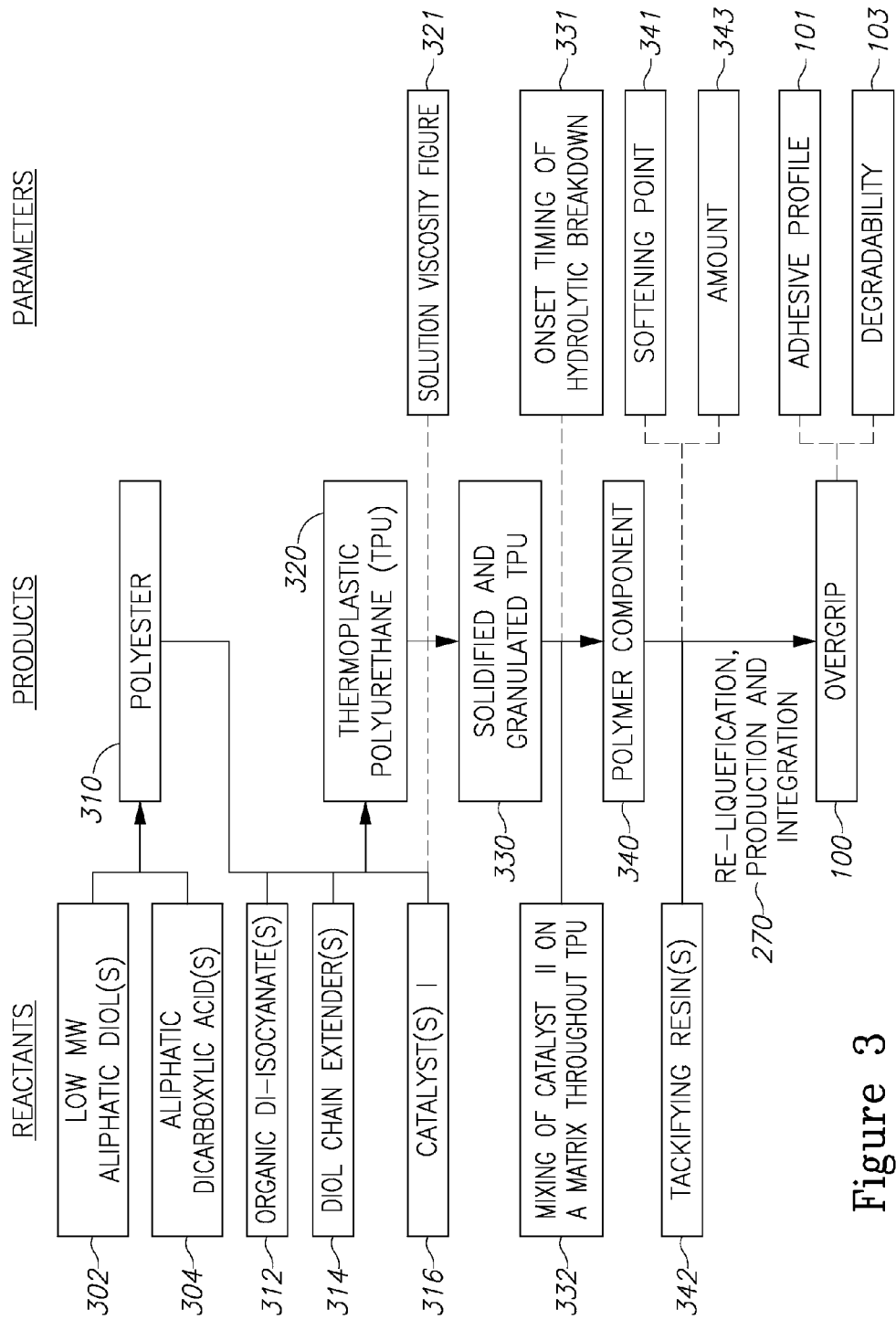
FIG. 3 is a high level schematic overview of a process for producing degradable thermoplastic polyurethane, polymer components and overgrips, according to some embodiments of the invention.

FIG. 1 is a high level schematic illustration of exemplary applications of degradable overgrips 100, according to some embodiments of the invention. FIG. 2 is a high level flowchart illustrating a method 200, according to some embodiments of the invention. FIG. 3 is a high level schematic overview of a process 300 for producing degradable thermoplastic polyurethane, polymer components and overgrips, according to some embodiments of the invention.

Disclosed overgrips 100 may be used on different handles 90, such as racquet handles (e.g., racquets for tennis, badminton, squash etc.), stick, bat and club handles (e.g., hockey sticks, baseball bats, cricket bats, golf clubs etc.), tool handles (e.g., garden tools such as shovels, clippers, hoes, trowels and pruners, working tools such as hammers and mallets, cleaning tools etc.), bicycle handles, paddle handles and so forth. It is noted that disclosed degradable thermoplastic polyurethane (TPU) may be used in a wide range of tapes and pads to provide required mechanical and chemical properties while maintaining their degradability (e.g., biodegradability), as explained below. It is noted that the uses illustrated in FIG. 1, namely (from left to right) a racquet, a stick, a tool handle, a bat and bicycle handles, are non-limiting and should be understood to encompass a wider range of application, including e.g., various tools and other hand held devices. The term "overgrip" is to be understood in a general sense to include any tape-like or pad-like article that may be used as a gripping interface at a gripping part of any device.

Overgrips 100 for specific used may be designed according to the specific use with respect to overgrip dimension and overgrip mechanical and chemical properties, as explained below. For example, overgrips 100 may be designed for single-handed use (as e.g., in as racquet sports) or for two-handed use on heavier handles (as, e.g., in bats). Overgrips 100 may be designed as straps (for winding on the handle) or as sleeves (for rolling over the handle) and their respective mechanical and chemical properties may be adjusted accordingly (e.g., as accommodation to handle material, to surface features of the handle, to required roughness with respect to both handle and gripping hands, etc.).

Method 200 comprises using degradable thermoplastic polyurethane (TPU) as the polymer component of overgrips (stage 210). The overgrip's degradation mechanism may be hydrolytic degradation, and may be controlled or regulated by process parameters as explained below, to combine use efficiency as overgrip and rapid degradation after disposal. The degradation mechanism may involve biodegradation. Method 200 comprises pre-blending a catalyst on a matrix (stage 240), dispersing a specified amount of the pre-blended catalyst throughout solid granular thermoplastic polyurethane (stage 245) to yield a polymer component, and determining an onset timing of hydrolytic breakdown of the polymer component by adjusting the specified amount of dispersed catalyst (stage 260).

Method 200 may further comprise using the polymer component in an overgrip (stage 270) and adjusting the polymer component according to an application of the overgrip (stage 275). For example, the polymer component may be used as a solution to impregnate overgrip material. Various solution concentrations and respective solution viscosities may be configured to fit specific overgrip uses. Certain embodiments comprise overgrips 100 comprising a polymer component produced by method 200. Certain embodiments comprise overgrips 100 comprising thermoplastic polyurethane, and a catalyst on a matrix, dispersed throughout a granular phase of the thermoplastic polyurethane at an amount selected to yield a specified onset timing of hydrolytic breakdown of the polymer component. The thermoplastic polyurethane may comprise a polyester reacted with organic di-isocyanate and at least one diol chain extender using catalytic amounts of at least one alkali or alkaline earth metal salt of at least one $C_{10}$ to $C_{45}$ aliphatic carboxylic acid. The polymer component may further comprise a tackifying resin added to the thermoplastic polyurethane to yield a specified adhesive profile of the overgrip.

Method 200 may further comprise reacting low molecular weight (MW) aliphatic diols with an aliphatic dicarboxylic acid to produce a polyester (stage 220); reacting the resulting polyester with organic di-isocyanate and at least one diol chain extender using catalytic amounts of at least one alkali or alkaline earth metal salt of at least one $C_{10}$ to $C_{45}$ aliphatic carboxylic acid (stage 230), the reacting configured to achieve a specified solution viscosity figure (stage 235), to produce thermoplastic polyurethane; solidifying and granulating the produced thermoplastic polyurethane (stage 237) and carrying out dispersing 245 throughout the produced solid granular thermoplastic polyurethane.

Process 300 schematically illustrates reactants, products and parameters of the disclosed reactions. The listed parameters are non-limiting examples for polymer and overgrip parameters which may be controlled by adjusting the respective reactions. At stage 210 (see FIG. 2), low MW aliphatic diol(s) 302 and aliphatic dicarboxylic acid(s) 304 are reacted to form polyester 310. At stage 230, polyester 310 is then reacted with organic di-isocyanate(s) 312, diol chain extender(s) 314 and first catalyst(s) 316 (marked catalyst(s) I) to yield thermoplastic polyurethane 320. The reaction is configured to yield specified solution viscosity figure 321 at given solution and tests. Second catalyst(s) 332 (marked catalyst(s) II and may be identical, similar or different from first catalyst 316) on a matrix is then mixed (stage 245) throughout solidified and granulated TPU 330 to yield polymer component 340. The mixing parameters are configured to determine onset timing of hydrolytic breakdown 331 of polymer component 340 and/or of eventual products such as overgrip 100. Tackifying resin(s) 342 may be added to polymer component 340 and be characterized e.g., by their softening point 341 and amount 343. After stage 270 of re-liquification of polymer component 340, production and integration into the product, overgrips 100 may be produced for different applications, and have specified adhesive profiles 101 and levels of degradability 103 as achieved by adjusting the process parameters.

In certain embodiments, the polymer component may be used in solutions of specified concentrations and respective viscosities, configured according to specific use cases. In certain embodiments, the polymer component may be applied as an approximately 20% solution in dimethyl formamide (DMF), having e.g., specified solution viscosity figure 321 at about 1000 centipoises (cps) or lower. Surfactants, chemicals (e.g., glycol) released from DMF and pigmentation may be incorporated in produced overgrip 100. In certain embodiments, matting additives may be used to regulate the look of overgrip 100, and water/moisture absorbents (e.g., silica gel) may be incorporated in overgrip 100 to regulate respective overgrip character. In certain embodiments (e.g., dry looking overgrip 100) the polymer component may be applied as a 10-12% solution in DMF, with addition of any of various additives to control the looks and characteristics of overgrip 100. In certain embodiments, specified solution viscosity figure 321 may be between 1100-1400 cp at 25° C. for a 30% solution of the polymer in DMF (as measured in one example on a Brookfield RV model viscometer, using spindle #4 rotating at a speed of 20 rpm), and respective solutions may be used in overgrip production.

Low molecular weight aliphatic diols 302 may be selected to have a molecular weight in a range of 500 to 3000, and yield an equivalent weight of 250 to 1500 and a free hydroxyl number of 37 to 224 of the polyester. Low molecular weight aliphatic diols 302 may comprise ethylene glycol and 1,4-butane diol at molar ratios between 0.7-1.3:0.7-1.3.

Aliphatic dicarboxylic acid 304 (e.g., $HOOC—(CH_2)_n—COOH$) may be between $C_4$-$C_{10}$ (total carbons, i.e., $2 \leq n \leq 8$). For example, aliphatic dicarboxylic acid 304 may comprise adipic acid ($C_6$). The degree of OH groups to ester groups in polyester 310 may be configured to yield a required backbone chain length needed for final elastomeric properties and the most effective number of ester groups that are able to be hydrolysed to achieve a desired TPU environmental breakdown.

Organic di-isocyanate(s) 312 may comprise 4,4'-diphenylmethane diisocyante and the molar ratios of NCO groups in organic di-isocyanate(s) 312 to the total isocyanate reactive groups in polyester 310 and diol chain extender(s) 314 may be about 1.00:1.01. The molar ratio of polyester polyols to chain extender may be configured to provide a specified tensile modulus and other specified elastomeric and durability properties. For example, when using a 2000 MW polyester the ration may be about 1.0:1.2.

Catalyst(s) I 316 (e.g., at least one alkali or alkaline earth metal salt of at least one $C_{10}$ to $C_{45}$ aliphatic carboxylic acid, used in stage 230) may e.g., comprise dibutyl tin dilaurate. The initial catalyst addition may be of 0.001% dibutyl tin dilaurate based on total TPU solids. Tin catalysts are preferred in the present invention as alternative metallic compounds based on lead, bismuth and mercury due to health and environmental hazards and as alternative zinc compounds are less efficient as catalysts. However, catalyst(s) I 316 may be any of the above (e.g., lead and bismuth octoates) under specific safety measures and/or efficiency considerations. Clearly, other tin-based catalysts can be used as catalyst(s) I 316 and/or catalyst(s) II 332.

At least one diol chain extender 314 may comprise 1,4-butane diol.

The present invention further comprises degradable polyurethane synthesized with the reactants illustrated above and according to any of the method stages.

Catalyst(s) II 332 dispersed on the matrix (pre-blended in stage 240) into solidified and granulated TPU 330 may be identical or similar to, or different from catalyst I 316. The matrix may be a talc matrix or any other type of inert and process compatible matrix. For example, the catalyst added on the matrix may be dibutyl tin dilaurate. For example, an additional incorporation of catalysts may comprise 0.1% dibutyl tin dilaurate, based on total resin solids, premixed onto a 0.2% talc base for ease of dispersion, and thoroughly blended into the solid, granulated TPU to be absorbed into the polymer matrix when the TPU is re-liquified 270, e.g., dissolved for the subsequent manufacture of the polymer material. The inventors have found out that the addition of the extra catalyst (e.g., in a small amount, not exceeding 0.1% based on total TPU solids) yields a TPU which can be hydrolysed by exterior moisture when discarded or thrown away at the end of its (considered) useful life. Without wishing to be bound by theory, the inventors believe that using a polyester polyol that has been produced with ethylene glycol as one of the diol reactants yields a greater number of ester groups and thereby makes the formed polyester backbone more hydrophilic. While in one example, approximately equal mole amounts of ethylene glycol and 1,4-butane diol were used, similar configuration and other amount ratios may be used to adjust the hydrophilicity of the polyester and the degradation timing of the TPU and overgrip 100. For example, the onset timing of hydrolytic breakdown of the polymer component may be set to be about one year. Shorter or longer timings may be achieved by respective adaptation of catalyst types and amounts. In certain embodiment, the percental proportions of the reactants may be modified within a range of ca. 2% as long as the required physical, chemical and engineering properties as well as the hydrolytic breakdown rate are maintained within specified values.

Advantageously, in contrast to known thermoplastic polyurethane made with polyesters based on very low MW component glycols which degrade very slowly at ambient conditions (by hydrolytic breakdown), the disclosed thermoplastic polyurethane, polymer component and/or overgrips comprising thereof were found to degrade more quickly and at timings which are at least roughly controlled by process parameters such as those illustrated in FIG. 3. As a non-limiting example, Table 1 illustrates a comparison of breakdown timings for exemplary overgrip 100 made according to the present invention with two prior art types of overgrips. The experimental setup included comparing samples sized 100 mm×25 mm×1-2 mm thick, of overgrip 100 with similarly sized samples of TPU's extracted from two other overgrip types. Samples (including duplicates) of each of the TPU overgrips were placed in small loosely lidded jars of water, which were then put into a water bath and held at up to 80° C. The jars were anchored to prevent them from tipping over. Samples were removed daily and checked for hydrolysis by comparing the indentations and resistance to damage from finger nail impressions. The presented times correspond to identification of first signs for hydrolytic breakdown. The values for lower temperatures were extrapolated based on thermodynamical principles and validated by measurements at 50° C. which were within one day of extrapolated data.

TABLE 1

Comparative hydrolytic breakdown times

| Temperature (° C.) | Present invention | Prior art type A | Prior art type B |
| --- | --- | --- | --- |
| 20 | 192 | 608 | 672 |
| 30 | 96 | 304 | 336 |
| 40 | 48 | 152 | 168 |
| 50 | 24 | 76 | 84 |
| 60 | 12 | 38 | 42 |
| 70 | 6 | 19 | 21 |
| 80 | 3 | 9.5 | 10.5 |

Evidently, overgrips 100 of the present invention were proved to degrade more rapidly than prior art overgrips. The inventors have discovered, that while addition of catalyst(s) II 332 during the preparation during the preparation of TPU 320 resulted in inappropriate properties (viscosity being too high and polymer component being too hard), it was the post reaction addition of catalyst(s) II 332 which enabled combining proper mechanical properties (mainly softness and flexibility) with the required degradability.

Method 200 may further comprise adding at least one tackifying resin at a specified proportion to the polymer component (stage 250). The tackifying resin may, for example, be aromatic hydrocarbon resin(s) having a softening point between 70-120° C. and added within a range of 5-15% from total solids of the thermoplastic polyurethane. Method 200 may further comprise controlling an adhesive profile of an overgrip comprising the polymer component by adjusting resin type and amount.

In certain embodiments, the tackifying resin may be selected from a range of tackifying resins used in other industries for similar purposes, for example in the adhesive industry for automotive applications or for building and construction, including for example hot melt adhesives, laminating adhesives, pressure sensitive adhesives etc.

With certain aromatic hydrocarbon resins, the inventors have found that too low a level of tackiness results when using 5% tackifying resin based on solid TPU and, conversely, a too high solution viscosity when using 15% tackifying resin, again based on solid TPU. Clearly, changing the type of tackifying resin may require adjusting its quantity in the overgrip. The type and relative proportion of the tackifying resin may be adjusted to reach a required level of tackiness and required process compatibility (e.g., solution viscosity), with respect to the relevant application.

Advantageously, in contrast with prior art TPU overgrip materials with mixed resins which significantly lose adhesiveness after few hours of racquet play, overgrips 100 according to certain embodiments of the present invention, particularly overgrips 100 with added tackifying resin(s) 342, are configured to have enhanced adhesiveness which lasts a significantly longer period of time. Moreover, the adhesiveness of the disclosed TPU's is increased by temperature and moisture (e.g., due to the player's grip, and on hotter and more humid days) and is hence more efficient as overgrip material. Players report that the adhesiveness of overgrip 100 lasts twice as long as prior art overgrips.

Advantageously, and surprisingly, while prior art TPU is very resistant, chemically and mechanically, and is hence not broken down when discarded or dumped in typical garbage and refuse tip conditions, the presently disclosed TPU, while being even better adapted to its functioning in overgrips with respect to its mechanical and chemical characteristics, also is degradable after the end of its usage, as is hence an environmentally-friendly decomposable material.

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for making a polymer component comprising:
    pre-blending a catalyst with an inert, process compatible matrix;
    dispersing the pre-blended catalyst on the matrix throughout solid granular thermoplastic polyurethane to yield a polymer component; and
    adjusting an onset timing of environmental hydrolytic breakdown of the polymer component by adjusting an amount of the catalyst dispersed throughout the solid granular thermoplastic polyurethane.

2. The method of claim 1, further comprising producing the solid granular thermoplastic polyurethane by:
    reacting low molecular weight aliphatic diols with aliphatic dicarboxylic acid to produce a polyester, the aliphatic diols having a molecular weight in a range of 500 to 3000, and yielding an equivalent weight of 250 to 1500 and a free hydroxyl number of 37 to 224 of the polyester;
    reacting the resulting polyester with at least one organic di-isocyanate and at least one diol chain extender using catalytic amounts of at least one alkali or alkaline earth metal salt of at least one $C_{10}$ to $C_{45}$ aliphatic carboxylic acid to achieve a specified solution viscosity figure, being between 1100-1400 centipoises at 25° C. for a 30% solution of the polymer in dimethyl formamide (DMF), to produce thermoplastic polyurethane; and
    solidifying and granulating the produced thermoplastic polyurethane and dispersing catalyst throughout the produced solid granular thermoplastic polyurethane.

3. The method of claim 2, wherein the low molecular weight aliphatic diols comprise ethylene glycol and 1,4-butane diol at molar ratios between 0.7-1.3:0.7-1.3.

4. The method of claim 2, wherein the aliphatic dicarboxylic acid is between $C_4$-$C_{10}$.

5. The method of claim 2, wherein the aliphatic dicarboxylic acid comprises adipic acid.

6. The method of claim 2, wherein the at least one diol chain extender is 1,4-butane diol.

7. The method of claim 1, wherein the matrix is a talc matrix and the catalyst is dibutyl tin dilaurate.

8. The method of claim 1, wherein the onset timing of the environmental hydrolytic breakdown of the polymer component is one year.

9. The method of claim 1, further comprising adding tackifying resin to the polymer component.

10. The method of claim 9, wherein the tackifying resin is an aromatic hydrocarbon resin having a softening point between 70-120° C. and added within a range of 5-15% from total solids of the thermoplastic polyurethane.

11. The method of claim 9, further comprising controlling an adhesive profile of an overgrip comprising the polymer component by adjusting resin type and amount within the solid granular thermoplastic polyurethane according to a viscosity of a thermoplastic polyurethane solution which is solidified and granulated to yield the solid granular thermoplastic polyurethane.

12. The method of claim 1, further comprising using the polymer component in an overgrip.

13. The method of claim 2, further comprising adjusting at least one of: the molecular weight range of the low molecular weight aliphatic diols and the specified solution viscosity figure, with respect to required dimensions and mechanical and chemical properties related to a use of the overgrip.

* * * * *